United States Patent
Nishiyama et al.

(10) Patent No.: US 8,109,090 B2
(45) Date of Patent: Feb. 7, 2012

(54) VARIABLE TURBO SUPERCHARGER AND METHOD OF RETURNING OIL FROM HYDRAULIC DRIVE

(75) Inventors: Toshihiko Nishiyama, Oyama (JP); Shuuji Hori, Oyama (JP); Takahisa Iino, Oyama (JP); Daisuke Kozuka, Oyama (JP)

(73) Assignee: Komatsu Ltd., Tokyo (JP)

( * ) Notice: Subject to any disclaimer, the term of this patent is extended or adjusted under 35 U.S.C. 154(b) by 459 days.

(21) Appl. No.: 12/447,423

(22) PCT Filed: Oct. 25, 2007

(86) PCT No.: PCT/JP2007/070780
§ 371 (c)(1),
(2), (4) Date: Apr. 27, 2009

(87) PCT Pub. No.: WO2008/053771
PCT Pub. Date: May 8, 2008

(65) Prior Publication Data
US 2010/0064684 A1    Mar. 18, 2010

(30) Foreign Application Priority Data
Oct. 27, 2006    (JP) .................................. 2006-293097

(51) Int. Cl.
*F02D 23/00*    (2006.01)
(52) U.S. Cl. .......................................... 60/602; 514/158
(58) Field of Classification Search ................... 60/602, 60/274; 415/157–158
See application file for complete search history.

(56) References Cited

U.S. PATENT DOCUMENTS

| | | | |
|---|---|---|---|
| 2,861,774 A * | 11/1958 | Buchi | 415/17 |
| 3,975,911 A * | 8/1976 | Morgulis et al. | 60/602 |
| 4,499,731 A * | 2/1985 | Moser | 60/602 |
| 4,571,154 A * | 2/1986 | Weber | 415/158 |
| 4,582,466 A * | 4/1986 | Szczupak | 415/150 |
| 5,044,880 A * | 9/1991 | McKean | 415/158 |
| 5,308,169 A | 5/1994 | Baker et al. | |
| 5,522,697 A * | 6/1996 | Parker et al. | 415/158 |
| 5,868,552 A | 2/1999 | McKean et al. | |

(Continued)

FOREIGN PATENT DOCUMENTS
EP        1 264 078 B1    12/2002
(Continued)

OTHER PUBLICATIONS

International Preliminary Report on Patentability and Written Opinion dated Apr. 28, 2009 (6 pages), issued in counterpart International Application Serial No. PCT/JP2O07/070780.

(Continued)

*Primary Examiner* — Thanh Lam
(74) *Attorney, Agent, or Firm* — Holtz, Holtz, Goodman & Chick, PC (57) ABSTRACT

Provided are a variable geometry turbocharger in which a drain pipe from a hydraulic servo drive device can be omitted and in which a member for transmitting power of the hydraulic servo drive device can be efficiently lubricated, and a method of returning oil from the hydraulic servo drive device. The variable geometry turbocharger includes a slide mechanism for changing an opening degree of a nozzle, the hydraulic servo drive device for driving the slide mechanism by hydraulic pressure, and drain flow paths for delivering oil exhausted from the hydraulic servo drive device into an oil return chamber adjacent to a turbocharger body.

9 Claims, 12 Drawing Sheets

U.S. PATENT DOCUMENTS

| | | |
|---|---|---|
| 2004/0128997 A1 | 7/2004 | Parker |
| 2005/0060999 A1 | 3/2005 | Mulloy et al. |
| 2005/0262841 A1 | 12/2005 | Parker |
| 2006/0010864 A1 | 1/2006 | Mulloy et al. |

FOREIGN PATENT DOCUMENTS

| | | |
|---|---|---|
| EP | 1 435 434 A2 | 7/2004 |
| JP | 4-183933 A | 6/1992 |
| JP | 6-58158 A | 3/1994 |
| JP | 2004-169703 A | 6/2004 |

OTHER PUBLICATIONS

Chinese Office Action dated Aug. 18, 2010 and English translation thereof in counterpart Chinese Application No. 200780040047.9.

English Language International Search Report dated Dec. 25, 2007 issued in parent Appln. No. PCT/JP2007/070780.

British Search Report dated Apr. 20, 2011 (in English) in counterpart British Application No. GB0908066.4.

* cited by examiner

VARIABLE TURBO SUPERCHARGER AND METHOD OF RETURNING OIL FROM HYDRAULIC DRIVE

This application is a U.S. National Phase Application under 35 USC 371 of International Application PCT/JP2007/070780 filed Oct. 25, 2007.

TECHNICAL FIELD

The present invention relates to a variable geometry turbocharger and a method of returning oil from a hydraulic drive device provided therein.

BACKGROUND ART

There has been conventionally known a variable geometry turbocharger in which an opening area of a nozzle provided to eject exhaust gas into an exhaust turbine can be adjusted. In such a variable geometry turbocharger, at a low speed revolution zone of an engine having a small displacement, a gap between exhaust inlet walls forming a nozzle is reduced to reduce an opening area thereof, thereby increasing a flow speed of exhaust gas flowing into the exhaust turbine. Thus, the rotary energy of a turbine wheel can be increased to enhance supercharging performance of a charging compressor.

A sliding mechanism in which one of the exhaust inlet walls is slid toward the other exhaust inlet wall is employed for adjusting the gap between the exhaust inlet walls, and the slide mechanism is driven by a pneumatic actuator (for example, Patent Document 1). Here, the pneumatic actuator is typically formed by a cylinder and a piston that slides within the cylinder, and the piston is slid in one direction by air pressure of a compressed air and in the other direction by a coil spring biasing the piston theretoward. When the piston is slid in the other direction, supply of the air pressure is interrupted.

While Patent Document 1 discloses the piston reciprocated by the air pressure and spring force, a hydraulic drive device may be employed in place of the pneumatic actuator to control the opening degree of the nozzle (Patent Document 2). In other words, a slide mechanism that varies the opening area of the nozzle is driven by the hydraulic drive device. In such a hydraulic drive device, a hydraulic servo piston is reciprocated by switching oil supply for hydraulic chambers provided on both sides of the hydraulic servo piston to transfer this reciprocating motion to the slide mechanism, thereby controlling the opening degree.
Patent Document 1: JP-A-11-72008
Patent Document 2: JP-T-2003-527522

DISCLOSURE OF THE INVENTION

Problems to Be Solved by the Invention

However, when the hydraulic drive device is employed, it is required to connect the hydraulic drive device and an oil source of a hydraulic tank or the like by a pipe for supplying oil and a pipe for draining the oil. Thus, the number of pipes is increased, which leads to a complicated arrangement.

Also, the driving force of the hydraulic drive device is transmitted to a mechanism for adjusting the opening area of the nozzle (e.g., the slide mechanism) via a driving force transmission mechanism. However, when oil from an engine body that lubricates a movable portion of a turbocharger body is used as a lubricant of such a driving force transmission mechanism, the lubrication may not be sufficient.

A first object of the invention is to provide a variable geometry turbocharger and a method of returning oil from a hydraulic drive device, which is capable of omitting a pipe for a drain from the hydraulic drive device.

A second object of the invention is to provide a variable geometry turbocharger and a method of returning oil from a hydraulic drive device, which is capable of efficiently lubricating a member that transmits power of the hydraulic drive device.

Means for Solving the Problems

A variable geometry turbocharger according to an aspect of the invention, includes: an opening degree changer that changes an opening degree of a nozzle; a hydraulic drive device that drives the opening degree changer by hydraulic pressure; and a drain flow path that delivers oil exhausted from the hydraulic drive device into a turbocharger body.

A method of returning oil from a hydraulic drive device according to another aspect of the invention includes delivering oil supplied to the hydraulic drive device into a turbocharger body, and draining the oil from the turbocharger body when an opening degree changer provided in a variable geometry turbocharger for changing an opening degree of a nozzle is driven by the hydraulic drive device.

With this arrangement, the oil exhausted from the hydraulic drive device passing through the drain flow path is delivered into the turbocharger body to be drained. Thus, a pipe for draining from the hydraulic drive device into a tank, an oil pan or the like can be omitted.

Also, the oil passing through the drain flow path efficiently lubricates a member provided around the drain flow path for transmitting power, thereby preventing friction of the member.

Incidentally, the turbocharger body is provided by a portion excluding the hydraulic drive device of various components and devices forming the variable geometry turbocharger.

In the variable geometry turbocharger according the aspect of the invention, the opening degree changer may include a driveshaft driven by the hydraulic drive device, and the drain flow path may be provided in the driveshaft.

With this arrangement, oil can be reliably delivered into the turbocharger body via the driveshaft since the drain flow path is provided in the driveshaft.

In the variable geometry turbocharger according to the aspect of the invention, the opening degree changer may be include a driveshaft supported by a bearing and driven by the hydraulic drive device, and the drain flow path may be provided by a gap between the bearing and the driveshaft.

With this arrangement, the driveshaft can be favorably lubricated since the oil is delivered around the driveshaft when the driveshaft is provided.

In the variable geometry turbocharger according to the aspect of the invention, a housing including the opening degree changer therein may be provided, and the drain flow path may be a port that intercommunicates an inside and an outside of the housing.

With such an arrangement, the drain flow path having an appropriate diameter can be relatively easily provided at an appropriate position of the housing irrespective of other members.

In the variable geometry turbocharger according to the aspect of the invention, the drain flow path may intercommunicate an inside of the variable turbocharger body and an oil reservoir of the hydraulic drive device.

Since the inside of the turbocharger body and the oil reservoir of the hydraulic drive device are communicated with each other, the oil can be remained in the oil reservoir. Even when the oil exhausted from the hydraulic drive device is suddenly increased, the oil can be reliably delivered into the turbocharger body.

BRIEF DESCRIPTION OF DRAWINGS

FIG. 2, which shows a slide mechanism of the variable geometry turbocharger, is a view on arrow II-II of FIG. 1.

BEST MODE FOR CARRYING OUT THE INVENTION

First Embodiment

A first embodiment of the invention will be described below with reference to the drawings.

Figure 1:
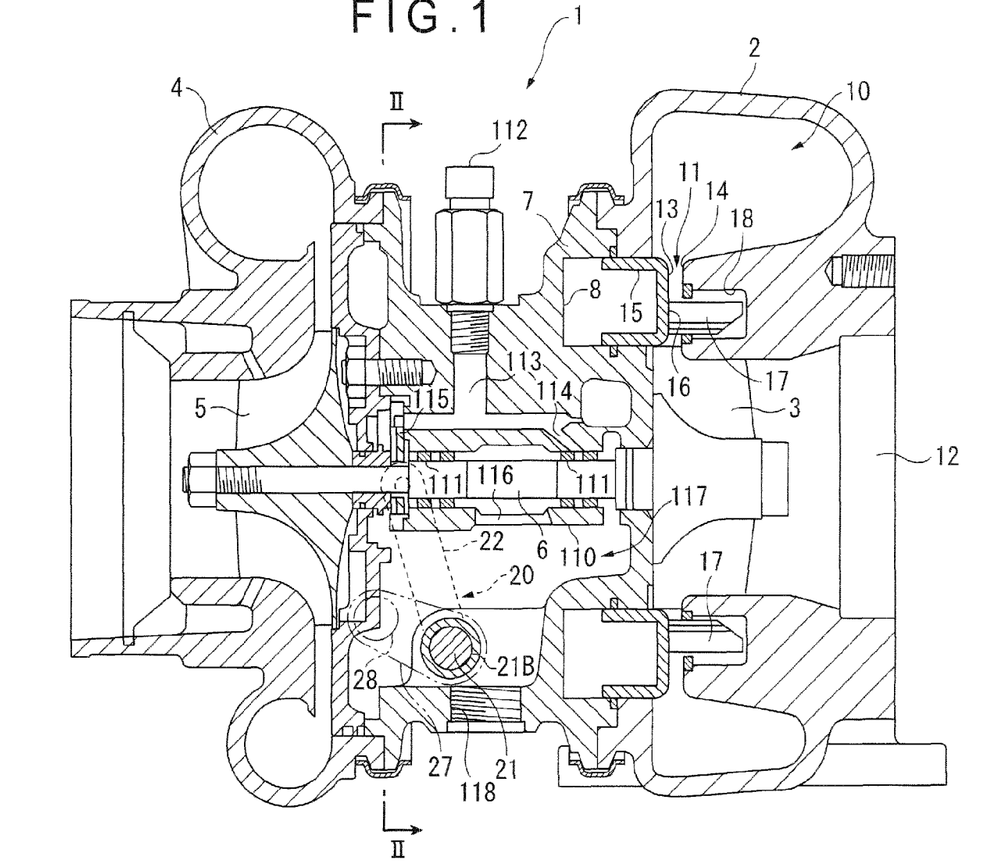
FIG. 1 is a cross sectional view showing a variable geometry turbocharger according to a first embodiment of the invention.

FIG. 1 is a cross sectional view showing a variable geometry turbocharger 1 according to the embodiment. The variable geometry turbocharger 1 includes a turbine on the right side of FIG. 1 and a compressor on the left side of FIG. 1, and is provided to an engine body (not shown). A turbine wheel 3 is housed in a turbine housing 2 adjacent to the turbine, and a compressor impeller 5 is housed in a compressor housing 4 adjacent to the compressor. A shaft 6 is integrally provided to the turbine wheel 3, and the compressor impeller 5 is attached to an end of the shaft 6. Accordingly, the rotation of the turbine wheel 3 rotated by exhaust gas is transmitted to the compressor impeller 5 via the shaft 6, and the rotation of the compressor impeller 5 compresses and charges intake gas.

The turbine housing 2 is provided with a volute-shaped exhaust inlet path 10 for introducing exhaust gas from the engine body. A nozzle 11 for injecting the exhaust gas toward the turbine wheel 3 is circumferentially and consecutively provided on the exhaust inlet path 10. After the exhaust gas injected from the nozzle 11 rotates the turbine wheel 3, the exhaust gas is exhausted from an exhaust exit 12. The nozzle 11 is formed by a pair of first and second exhaust inlet walls 13 and 14 that face each other.

The first exhaust inlet wall 13 is formed by a lateral side 16 of an annular movable ring 15 having a square C-shaped cross section. The movable ring 15 is housed in an annular housing portion 8 provided to a center housing 7. A plurality of nozzle vanes 17 that project toward the second exhaust inlet wall 14 are attached on the lateral side 16 of the movable ring 15 at equal circumferential intervals. A circumferentially consecutive recess 18 is formed on the exhaust inlet wall 14, and an end of each nozzle vane 17 is housed within the recess 18. With this structure, when the movable ring 15 is advanced and retreated by a slide mechanism 20 described below, the first exhaust inlet wall 13 is moved toward and away from the second exhaust inlet wall 14 to change the opening area of the nozzle 11.

A bearing 110 for supporting the shaft 6 is provided within the center housing 7. The shaft 6 is inserted into the bearing 110 to be supported by a journal bearing 111. An oil inflow section 112 for introducing oil from the engine body is provided on an upper side of the bearing 110 in the Figure. The oil delivered in the oil inflow section 112 passes through an internal flow path 113 within the center housing 7. A part of the oil is further supplied into the bearing 110 from a branch flow path 114 to lubricate and cool the rotating portion of the shaft 6. Another part of the oil is delivered to a partition adjacent to the turbine to prevent heat transmission from the turbine to the center housing 7. Further, still another part of the oil lubricates a thrust bearing 115 and then flows into the bearing 110. The oil for lubricating and cooling the bearing 110, for instance, flows down to an oil return chamber 117 within the center housing 7 through an outflow opening 116 provided on the bearing 110 to be drained into the engine body from a return opening 118 provided on a bottom of the oil return chamber 117.

Incidentally, because an arrangement of the compressor is the same as that of a typical turbocharger which is commonly known, a detailed description thereof will be omitted. The slide mechanism 20 will be described in detail below.

Figure 2:
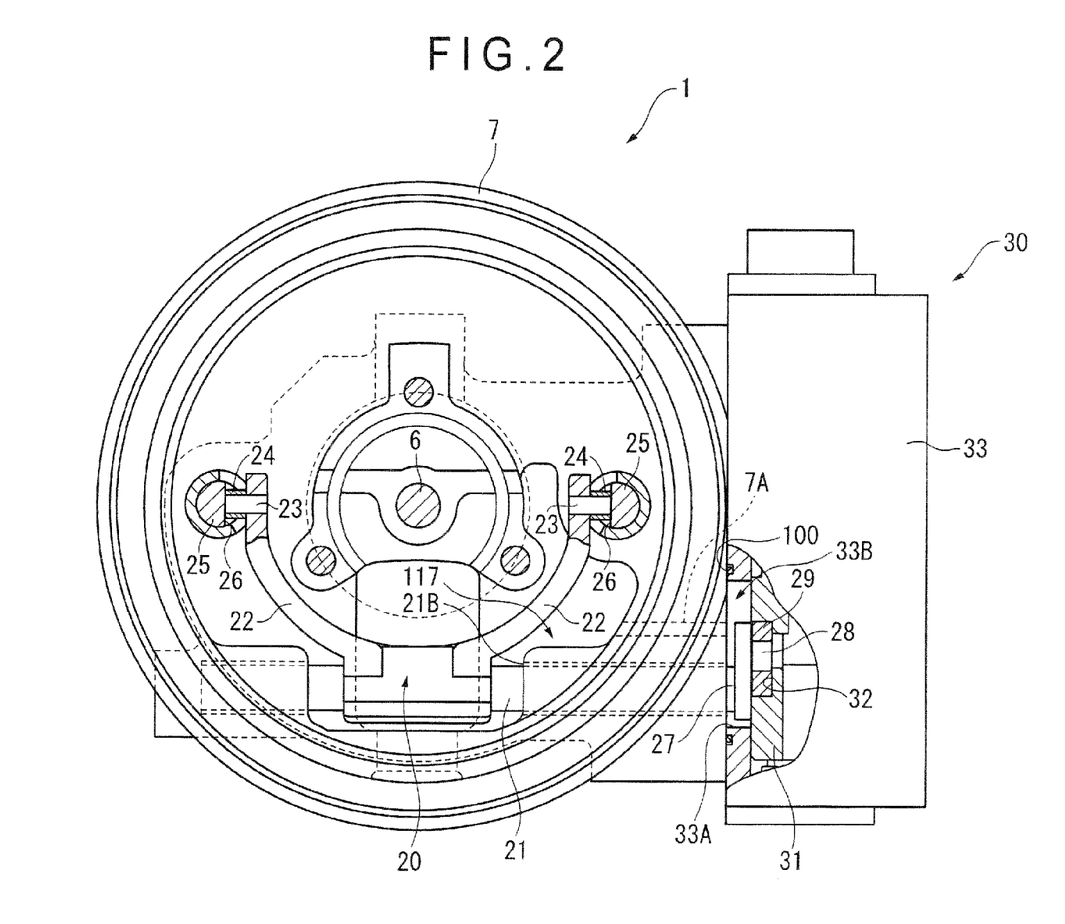
Figure 3:
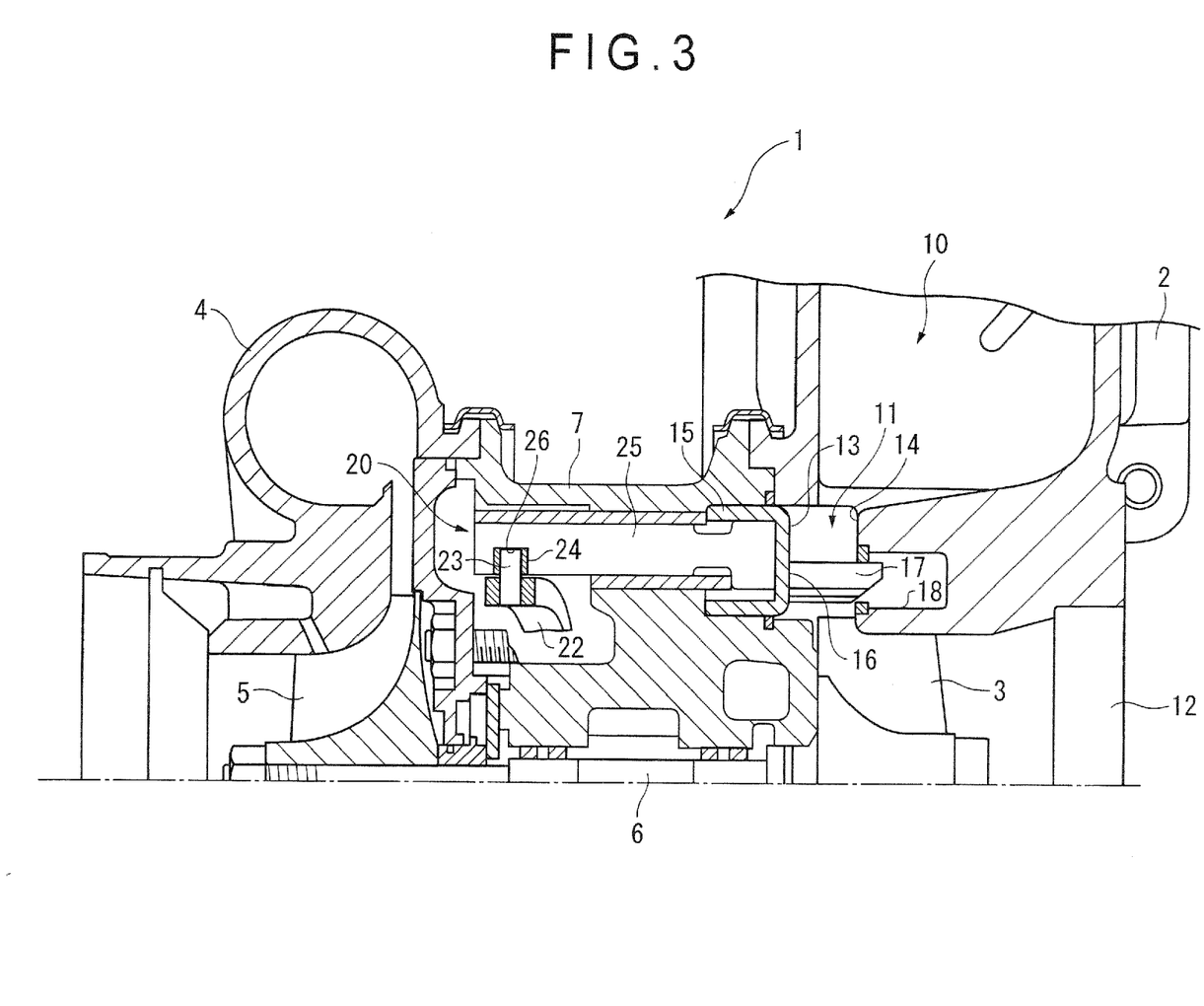
FIG. 3 is across sectional view showing a primary part of the slide mechanism.

In the slide mechanism 20, a driveshaft 21 inserted through a lower side of the center housing 7 is rotated to advance and retract the above-noted movable ring 15. FIGS. 2 and 3 show a primary part of the slide mechanism 20. In FIGS. 2 and 3, a pair of arc-shaped arms 22, 22 extending upward are fixed at intermediate positions of the driveshaft 21. A pin 23 projecting horizontally and outwardly is attached to an end of each arm 22, and a slider 24 is fitted into the pin 23. The slider 24 is slidably fitted with a slide groove 26 adjacent to a base end of a support rod 25 parallel to the shaft 6. A distal end of the support rod 25 is abutted to a rear side of the movable ring 15.

Accordingly, when the driveshaft 21 is rotated, the arm 22 swings in an axial direction of the shaft 6, so that the support rod 25 is moved to move the movable ring 15, thereby advancing and retracting the first exhaust inlet wall 13 relative to the second exhaust inlet wall 14. In the slide mechanism 20, the support rod 25 having the arm 22, the pin 23, the slider 24, and the slide groove 26 provides a converter that converts the rotary movement of the driveshaft 21 to the advancing and retracting movement of the first exhaust inlet wall 13.

The driveshaft 21 of the slide mechanism 20 is rotated by a hydraulic servo drive device 30 via an arm 27 provided on an end of the driveshaft 21. The hydraulic servo drive device 30 will be described in detail below.

Figure 4:
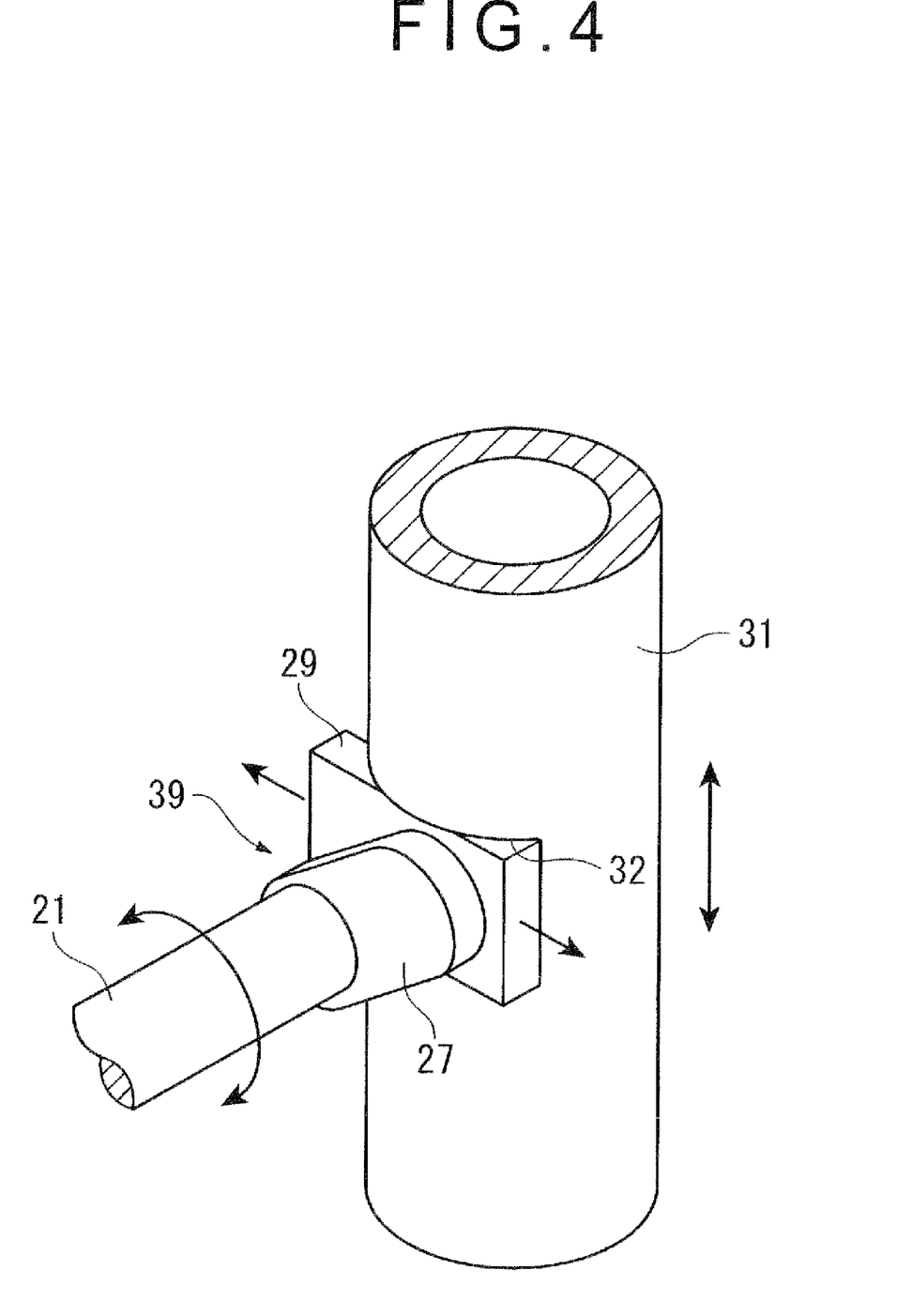
FIG. 4 is a perspective view showing a connecting section of the slide mechanism and a hydraulic servo drive device.
Figure 5:
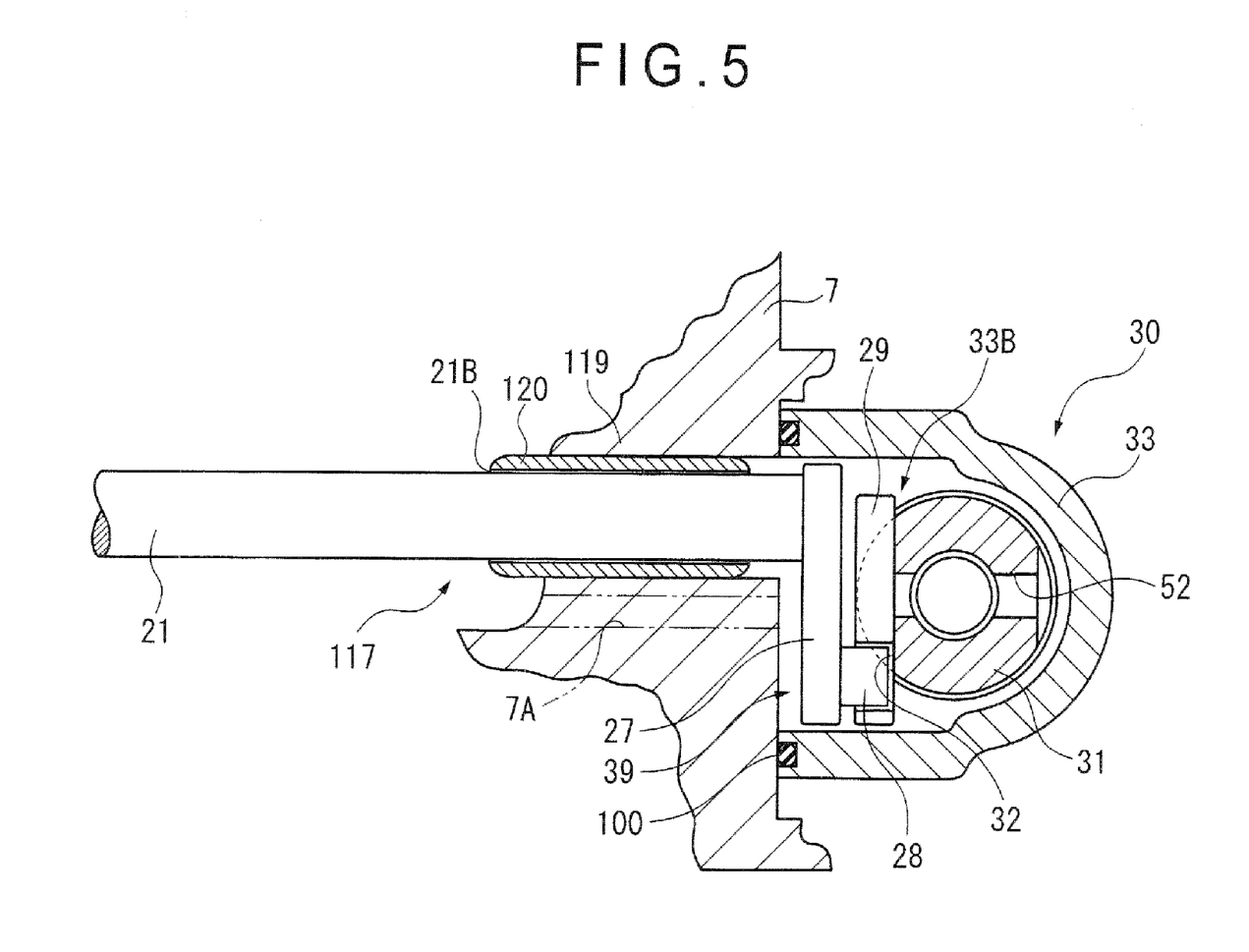
FIG. 5 is a cross sectional view showing the connecting section of the slide mechanism and the hydraulic servo drive device.

As shown in FIGS. 4 and 5, basically, the hydraulic servo drive device 30 rotates the driveshaft 21 as a result of vertical reciprocation of a servo piston 31. Thus, a slide groove 32 perpendicular to an axial direction of the servo piston 31 is provided on an outer circumference thereof; a pin 28 projecting toward the slide groove 32 is provided on the arm 27 adjacent to the driveshaft 21; a slider 29 is fitted into the pin 28; and the slider 29 is slidably fitted with the slide groove 32.

In other words, in this embodiment, another converter is provided, which includes the slide groove 32, the slider 29, the pin 28, and the arm 27 and converts the advancing and retracting movement of the servo piston 31 into the rotary movement of the driveshaft 21. With the vertical movement of the servo piston 31, the slider 29 moves up and down and slides along the slide groove 32. Such movement of the slider 29 and the rotation of the pin 28 allow an arc movement of the arm 27 to rotate the arm 27.

Incidentally, the converter is housed in an oil reservoir 33B provided within the housing 33 of the hydraulic servo drive device 30. The oil reservoir 33B contains the oil exhausted after being used for the movement of the servo piston 31. The oil reservoir 33B is consecutively provided in a circumferential direction of the housing 33 to embrace an outer circumference of the servo piston 31 at a predetermined width.

The oil reservoir 33B is communicated with the oil return chamber 117 provided in the center housing 7 through a drain flow path 7A provided in the center housing 7. In other words, one end of the drain flow path 7A is opened toward the oil reservoir 33B and the other end is opened toward the oil return chamber 117. Thus, the oil sent into the oil reservoir 33B is delivered into the center housing 7 through the drain flow path 7A, and further passes through a drain path 75 from the return opening 118 in order to be drained into the engine body. The drain flow path 7A is provided for returning the oil from the oil reservoir 33A through the turbocharger body. The processing thereof is simplified and a degree of design freedom is increased.

The driveshaft 21 is inserted into the oil reservoir 33B via an opening 33A. The driveshaft 21 is axially supported by a bearing 119 provided in the center housing 7. A bush 120 is disposed in the bearing 119, and the driveshaft 21 penetrates the bush 120 to be supported. While the bush 120 is pressed in the bearing 119, a gap capable of forming an oil film is provided between the bush 120 and the driveshaft 21. In other words, the gap can also serve as a drain flow path 21B, so that the oil in the oil reservoir 33B is delivered toward the center housing 7 through the drain flow path 21B, thereby favorably lubricating the driveshaft 21.

Figure 6:
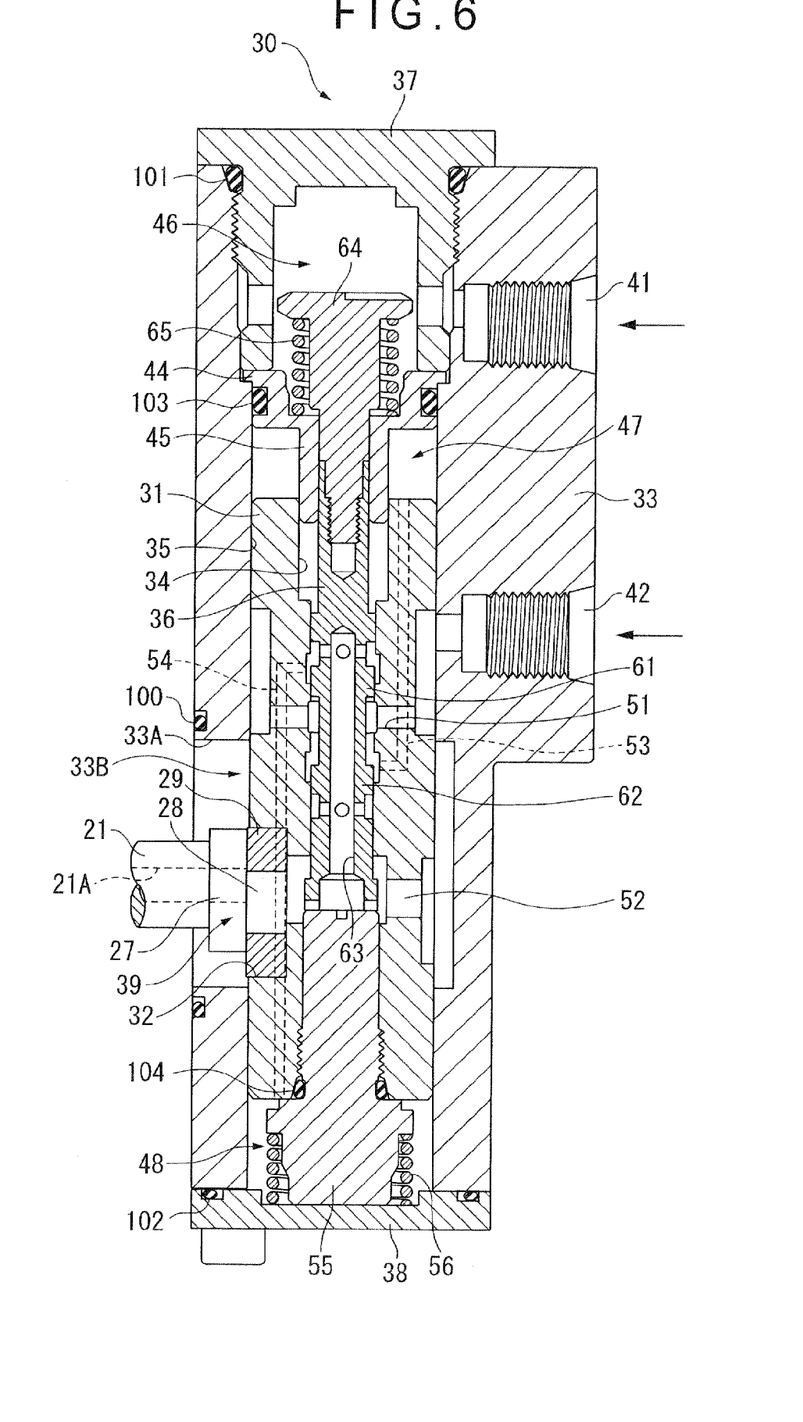
FIG. 6 is a cross sectional view showing the hydraulic servo drive device.

FIG. 6 is a cross sectional view showing the hydraulic servo drive device 30. In FIG. 6, the hydraulic servo drive device 30 includes: the servo piston 31; a housing 33 which slidably houses the servo piston 31 and a part of which forms an opening 33A; and a pilot spool 36 which is housed in a center hole 34 axially penetrating the servo piston 31 and slides by pilot pressure. The hydraulic servo drive device 30 is mounted to the center housing 7 of the variable geometry turbocharger 1 via an O-ring 100 that seals a surrounding of the opening 33A.

The housing 33 has a vertically penetrating cylindrical cylinder 35 inside thereof. The servo piston 31 is housed in the cylinder 35. Upper and lower ends of the cylinder 35 are hermetically covered by covers 37 and 38 via the O-rings 101 and 102. A connecting section 39 of the driveshaft 21 and the servo piston 31 is provided at a position corresponding to the opening 33A of the housing 33. Thus, the sizes of the opening 33A and the oil reservoir 33B are determined in consideration of sliding amount of the servo piston 31 and the slider 29, flow volume of the exhausted oil, and the like.

Figure 9:
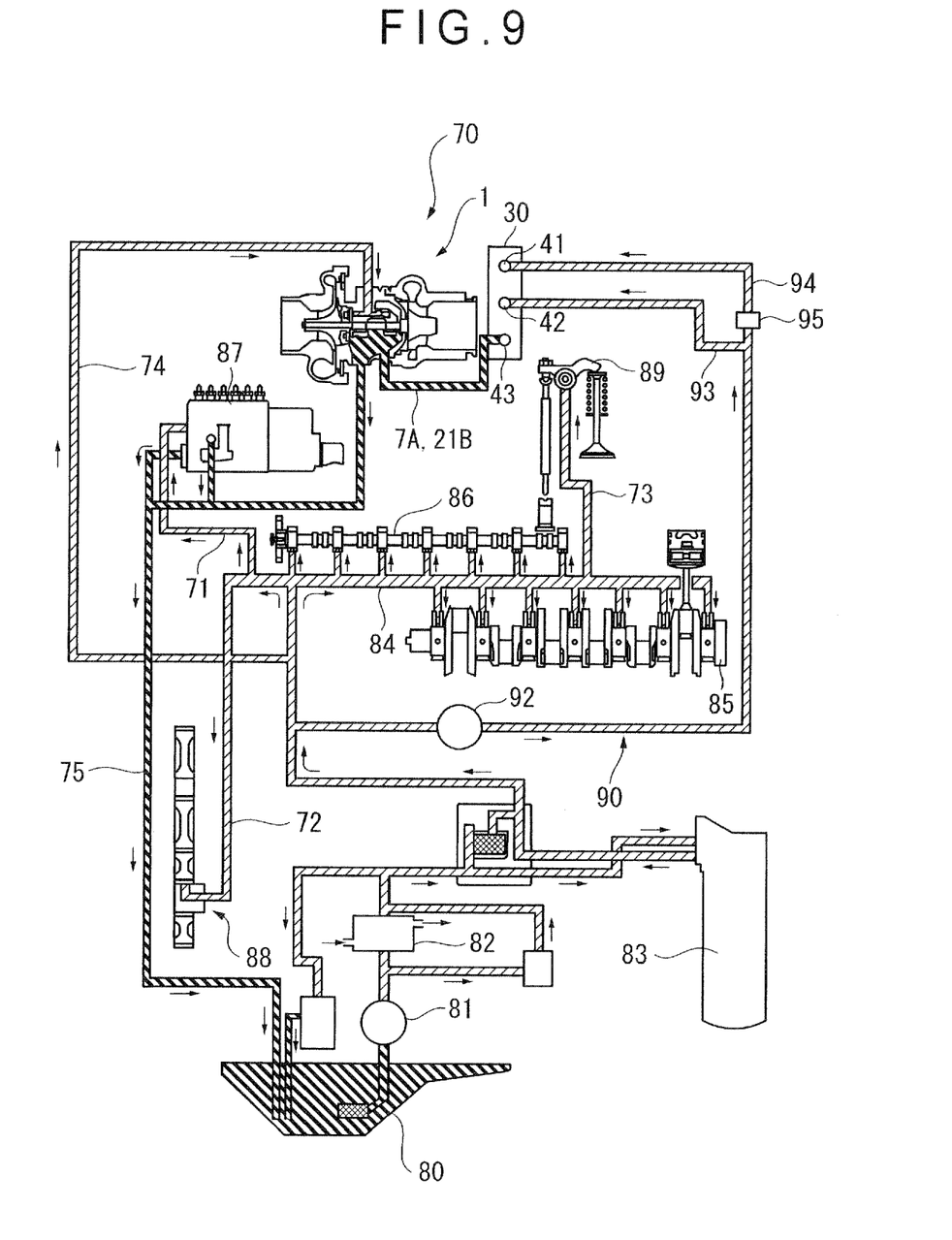
FIG. 9 is a schematic view showing a lubrication circuit of an engine.

A side of the housing 33 remote from the opening 33A includes: a pilot port 41 for supplying pilot pressure from, e.g., a proportional solenoid valve 95 (FIG. 9) positioned apart from the variable geometry turbocharger 1; and a pump port 42 for supplying oil from a pressure elevation pump 92 (FIG. 9). The pressure elevation pump 92 and the proportional solenoid valve 95 are installed in the same engine body (not shown) as the one in which the variable geometry turbocharger 1 of the embodiment is installed.

The cylinder 35 of the housing 33 is partitioned by a partition 44 into a portion where the servo piston 31 slides and a portion thereabove. The partition 44 abuts to a stepped portion formed on an inner circumferential surface of the cylinder 35, and an O-ring 103 for sealing the space partitioned by the partition 44 is provided in the vicinity of the abutting portion. The partition 44 is provided with a tubular section 45 extending downward, and the tubular section 45 is inserted into an upper side of the center hole 34 of the servo piston 31. The upper one of the spaces partitioned by the partition 44 forms a pilot hydraulic chamber 46, which is communicated with the pilot port 41.

On the other hand, the lower one of the spaces partitioned by the partition 44 forms a first hydraulic chamber 47 which is provided by the partition 44 and an upper end surface of the servo piston 31. In other words, the pilot hydraulic chamber 46 is displaced outward in an axial direction (upward in the embodiment), thereby preventing enlargement of the hydraulic servo drive device 30 as a whole. In addition, a second hydraulic chamber 48 is formed between a lower end surface of the servo piston 31 and a lower cover 38.

Next, the servo piston 31 will be described. The servo piston 31 is provided with a pressure port 51 for intercommunicating the center hole 34 and the pump port 42 of the housing 33 and for delivering the oil from the pump into the center hole 34. Outer sides of the pressure port 51 are opened on grooves formed radially opposing to each other. Since the grooves have a predetermined vertical dimension, the pressure port 51 and the pump port 42 are unceasingly communicated in the strokes of the servo piston 31.

Further, the servo piston 31 is provided with a return port 52 that intercommunicates the center hole 34 and the oil reservoir 33B of the housing 33 to deliver the oil in the center hole 34 into the center housing 7 of the turbocharger body. An outer side of the return port 52 is opened on a groove formed on an outer circumference of the servo piston 31, so that the return port 52 and the oil reservoir 33B are unceasingly communicated in the strokes of the servo piston 31. In this embodiment, the return port 52 radially penetrates the servo piston 31, and a part of the drained oil is delivered into the oil dump chamber 33B from the slide groove 32 into which a slider 29 is fitted.

Furthermore, as shown in FIG. 6 by dotted lines, the servo piston 31 is provided with a first piston port 53 for intercommunicating the center hole 34 and an upper first hydraulic chamber 47 and a second piston port 54 for intercommunicating the center hole 34 and a lower second hydraulic chamber 48. Here, the opening of the first piston port 53 adjacent to the center hole 34 is positioned more downward than the opening of the pressure port 51, and the opening of the second piston port 54 adjacent to the center hole 34 is positioned more upward than the opening of the pressure port 51. The first and second piston ports 53 and 54 are each displaced so as not to communicate with the pressure port 51 or the return port 52.

An abutment member 55 is screwed with the servo piston 31 via an O-ring 104 to hermetically close the lower side of the center hole 34. The servo piston 31 abuts to the cover 38 via the abutment member 55, and a lowermost position of the servo piston 31 is determined at a position of the abutment. A coil spring 56 is disposed between the cover 38 and the abutment member 55 within the second hydraulic chamber 48 to assist an upward movement of the servo piston 31. Even when the oil in a pipe connected to the hydraulic servo drive device 30 is lost due to, e.g., a trouble of the pressure elevation pump 92, spring force of the coil spring 56 keeps the nozzle openness of the variable geometry turbocharger 1 at an opened state (preferably at a fully opened state).

The pilot spool 36 includes two spool lands, i.e., first and second spool lands 61 and 62 at a substantially central portion thereof. A return flow path 63 opened downward is provided to an inside of the pilot spool 36, and an upper groove of the first spool land 61 and the return flow path 63 are communicated with each other while a lower groove of the second spool land 62 and the return flow path 63 are communicated with each other likewise. In addition, since the lower side of the return flow path 63 is opened, this return flow path 63, the return port 52, and the oil reservoir 33B are communicated.

The pilot spool 36 is vertically slidable in the center hole 34 of the servo piston 31 through the tubular section 45 of the partition 44, and an upper end of the pilot spool 36 is screwed and fixed to a holder 64 disposed within the pilot hydraulic chamber 46. The holder 64 is biased upward by a coil spring 65 in the pilot hydraulic chamber 46. The pilot spool 36 is moved downward by pilot pressure resisting the biasing force of the coil spring 65 and upward by the biasing force of the coil spring 65 with the return of the pilot oil (drained to an oil pan 80 adjacent to the solenoid valve 95 though the drain flow path is not shown).

In the hydraulic servo drive device 30 having such an arrangement, when the pilot spool 36 is elevated relative to the servo piston 31, the servo piston 31 is advanced following the elevation, and when the pilot spool 36 is lowered, the servo piston 31 is retracted following the lowering movement. Here, since the pilot spool 36 only slides axially in the servo piston 31, drive load at the time of advancement and retreat of the movable ring 15 is applied on the servo piston 31 via the slide mechanism 20 but not at all on the pilot spool 36.

Accordingly, in this embodiment, when position of the pilot spool 36 is controlled for position control of the servo piston 31 and further for advancing and retreating the movable ring 15 to change the opening area of the nozzle 11, the position control of the pilot spool 36 can be performed without being influenced by the drive load, so that load drift can be eliminated. Thus, even when fluid pressure deriving from exhaust gas is unstable in a turbocharger, that is, even in a case of the variable geometry turbocharger 1 of the embodiment, the opening area of the nozzle 11 can be easily controlled for precise control of emission. In addition, because the position control can be accurately performed, control format may be changed from the feedback control to the feedforward control to reduce response time and to handle transients with accuracy.

Next, operation of the hydraulic servo drive device 30 will be specifically described with reference to FIGS. 6 to 8. In FIG. 6, because the pilot pressure that overcomes the biasing force of the coil spring 65 is supplied, both the pilot spool 36 and the servo piston 31 are disposed at a lowermost position. Thus, in this state, a lower end of the pilot spool 36 abuts to an upper end of the abutment member 55, and a lower end of the abutment member 55 abuts to the cover 38. Further, at this position, the upper first spool land 61 of the pilot spool 36 is displaced downward relative to the second piston port 54; the second piston port 54 is communicated with the return port 52 through the return flow path 63; and the oil in the second hydraulic chamber 48 is drained.

On the other hand, the lower second spool land 62 is also displaced downward relative to the first piston port 53, and the pressure port 51 and the first piston port 53 are communicated with each other. Accordingly, the oil is supplied to the first hydraulic chamber 47 through the pressure port 51 and the first piston port 53.

Incidentally, a part of the oil supplied to the pilot hydraulic chamber 46 passes through a slight gap formed between the tubular section 45 of the partition 44 and the holder 64 or a slight gap formed between the tubular section 45 and an outer circumference of an upper end of the pilot spool 36, and enters a space defined therebelow, that is, a space defined by an inner circumference of the center hole 34 of the servo piston 31, an outer circumference of the pilot spool 36, and a lower end of the tubular section 45.

Figure 7:
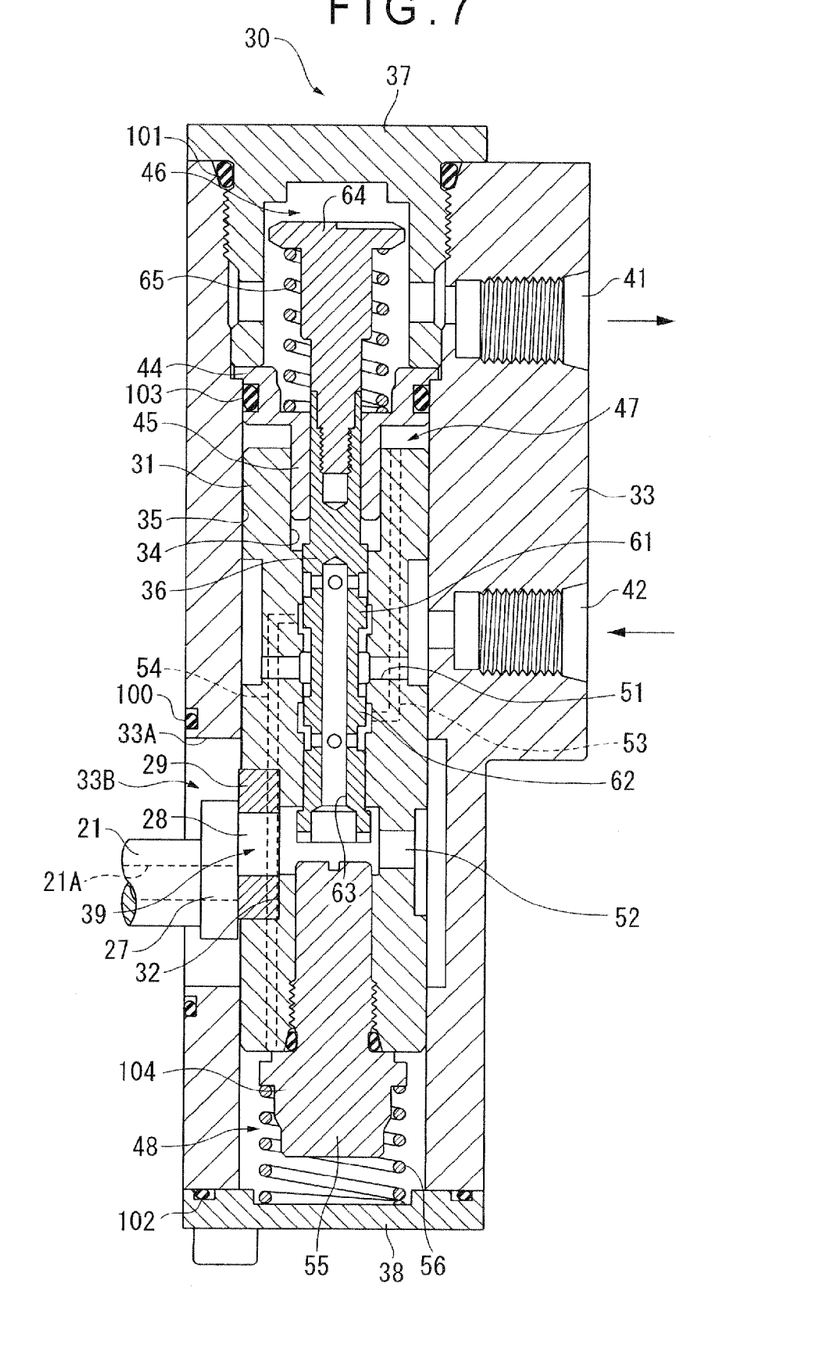
FIG. 7 is a cross sectional view for explaining a movement of the hydraulic servo drive device.

When the pilot pressure is lowered from this state to a predetermined value by returning the oil in the pilot hydraulic chamber 46 as shown in FIG. 7, the pilot spool 36 is elevated to a position where the pilot pressure is balanced with the force of the coil spring 65. At this time, the upper first spool land 61 is displaced to an upper side of the second piston port 54, so that the second piston port 54 and the pressure port 51 become communicated to supply the oil to the second hydraulic chamber 48.

At the same time, because the lower second spool land 62 is displaced to an upper side of the first piston port 53, the first piston port 53 and the return flow path 63 become communicated, and a part of the oil in the first hydraulic chamber 47 is drained, so that the servo piston 31 is advanced following the elevation of the pilot spool 36. This advancement of the servo piston 31 ends when the first and second piston ports 53 and 54 are closed by the first and second spool lands 61 and 62, and the servo piston 31 pauses similarly to the pilot spool 36 at a position corresponding to the pause position of the pilot spool 36. The servo piston 31 does not surpass the pilot spool 36 while elevating.

Figure 8:
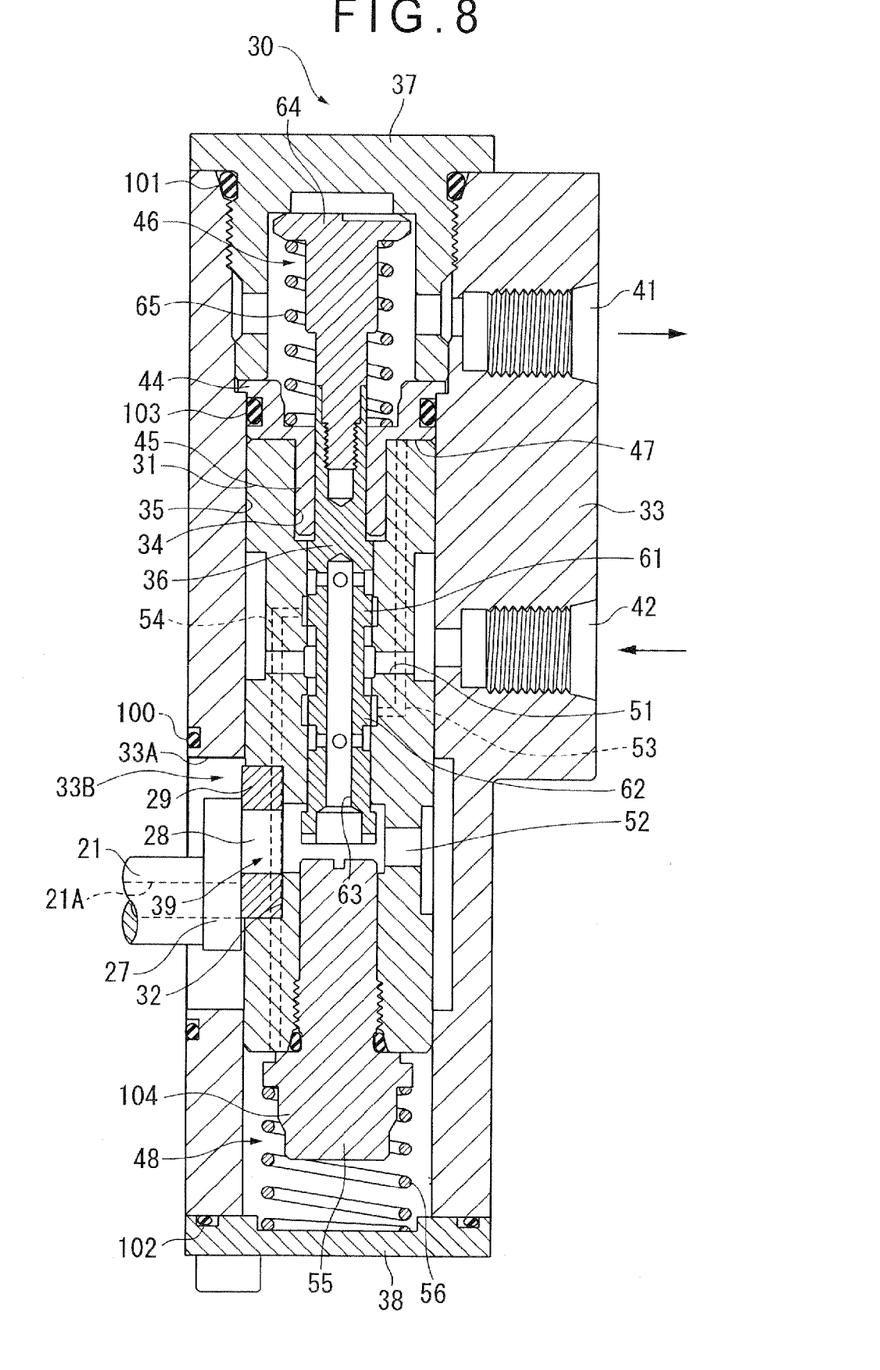
FIG. 8 is another cross sectional view for explaining the movement of the hydraulic servo drive device.

Next, as shown in FIG. 8, when the pilot pressure is completely released, the pilot spool 36 moves upward to a position where an upper end of the holder 64 abuts to a ceiling of the pilot hydraulic chamber 46. The servo piston 31 follows this upward movement, and is advanced until the upper end thereof abuts to the partition 44. At this time, the pilot spool 36 and the servo piston 31 are both disposed at an uppermost position, and the first and second pistons ports 53 and 54 are respectively closed by the first and second spool lands 61 and 62 with the second hydraulic chamber 48 full of oil. The oil in the first hydraulic chamber 47 is exhausted from the return port 52 into the oil reservoir 33B, and delivered into the oil return chamber 117 of the center housing 7 through the drain flow path 7A provided in the center housing 7 and the drain flow path 21B provided by a gap surrounding the driveshaft 21 to be drained into the oil pan 80 of the engine body.

Here, the oil that has entered the space defined by the inner circumference of the center hole 34 of the servo piston 31, the outer circumference of the pilot spool 36, and the lower end of the tubular section 45 returns to the pilot hydraulic chamber 46 through the above-mentioned gap.

To lower the servo piston 31 to a predetermined position, the pilot pressure is supplied to lower the pilot spool 36 to a predetermined position. Consequently, the second piston port 54 is again communicated with the return flow path 63 to drain a part of the oil of the second hydraulic chamber 48, thus lowering the servo piston 31. This lowering movement ends when the first and second piston ports 53 and 54 are closed by the first and second spool lands 61 and 62, and the servo piston 31 pauses at a position corresponding to the position where the pilot spool 36 pauses. The servo piston 31 does not surpass the pilot spool 36 while being lowered. Also, the oil in the second hydraulic chamber 48 is delivered into the oil reservoir 33B from the return port 52, and then delivered into the oil return chamber 117 through the drain flow paths 7A and 21B to be drained into the engine body.

In the hydraulic servo drive device 30 that is operated as described above, the drained oil as a result of the movement of the servo piston 31 lubricates the driveshaft 21 to be drained via the turbocharger body, which favorably prevents seizure and friction of the driveshaft 21 and improves durability of the bush 120. Further, since a drain path provided between the hydraulic servo drive device 30 and the oil pan 80 for a direct communication therebetween is not required, a piping layout for a hydraulic circuit within a narrow engine room as in that of a construction equipment can be facilitated.

FIG. 9 schematically shows a lubrication circuit 70 of an engine in which the variable geometry turbocharger 1 of the embodiment is installed. In the lubrication circuit 70, the lubricating oil in the oil pan 80 is pumped up by a hydraulic pump 81 and supplied to a main gallery 84 via an oil cooler 82 and an oil filter 83. The lubricating oil from the main gallery 84 is mainly used to lubricate a crankshaft 85 and a camshaft 86.

The lubrication circuit 70 includes the following paths that are branched from the main gallery 84: an injector-side path 71 for lubricating a cam driver or the like in a fuel injector 87, a transmission-mechanism-side path 72 for lubricating a power transmission mechanism 88 that includes a timing gear; a rocker-arm-side path 73 for lubricating a rocker arm 89; a turbocharger-side path 74 for lubricating the bearing 110 that supports the shaft 6 of the variable geometry turbocharger 1; and a drain path 75 for returning the lubricating oil from the variable geometry turbocharger 1 and the fuel injector 87 to the oil pan 80. In addition, in this embodiment, an oil supply path 90 for supplying a part of the lubricating oil to the hydraulic servo drive device 30 as the driving oil is provided independently from the lubrication circuit 70. Also, the drain flow paths 7A and 21B for delivering the oil from the oil reservoir 33B of the hydraulic servo drive device 30 to the turbocharger body are provided as described above. The drain flow paths 7A and 21B are connected to the drain path 75.

In other words, in the embodiment where the oil for driving the hydraulic servo drive device 30 is fed by a part of an engine lubricating oil, the oil supply path 90 is branched before the main gallery 84 for supplying the oil. The pressure elevation pump 92 is provided adjacent to a base end of the oil supply path 90, and the pressurized oil is supplied to the pump port 42 of the hydraulic servo drive device 30 through a driving pressure path 93 adjacent to a distal end of the oil supply path 90. A discharge pressure of the hydraulic pump 81 is approximately in the range of 196 to 294 kN/m$^2$ (2 to 3 kg/cm$^2$), and a discharge pressure after pressurization by the pressure elevation pump 92 is approximately 1470 kN/m$^2$ (15 kg/cm$^2$). Here, the distal end of the oil supply path 90 is branched into the driving pressure path 93 for supplying oil into the pump port 42 and the pilot pressure path 94 for supplying pilot pressure into the pilot port 41 of the hydraulic servo drive device 30, and therefore the pilot pressure path 94 is provided with the proportional solenoid valve 95 for generating the pilot pressure. By applying a predetermined electric current to the solenoid valve 95, pilot pressure in the range of 0 to 1470 kN/m$^2$ (0 to 15 kg/cm$^2$ corresponding to the electric current can be generated to move the pilot spool 36 to a position corresponding to the pilot pressure.

Though not illustrated, a cooling water path is also connected to the turbocharger body, and water passing through the cooling water path is used for cooling. Also, though it may appear that FIG. 9 shows an end of a return side of the drain path 75 connected to the oil pan 80, the end is connected to the engine body and the oil is returned into the oil pan 80 through the engine body.

Second Embodiment

Figure 10:
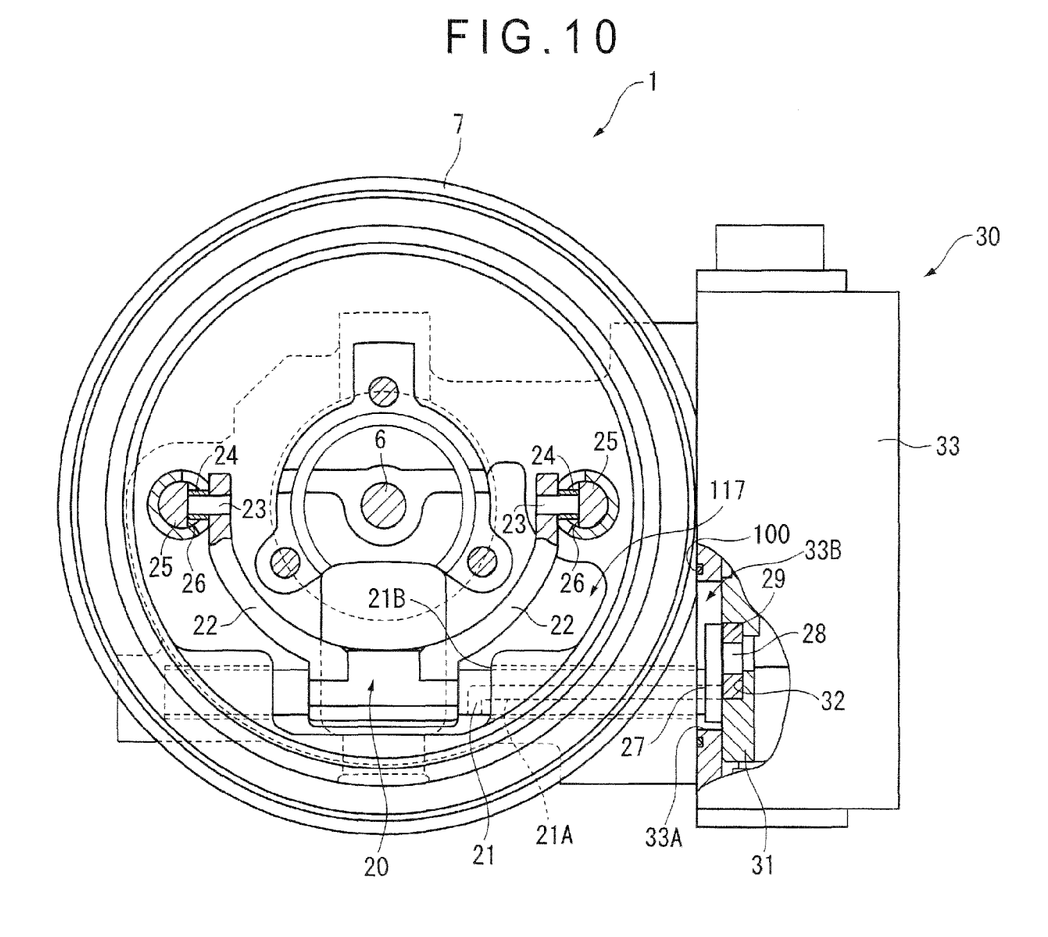
FIG. 10 shows a second embodiment of the invention.

FIG. 10 shows a second embodiment of the invention. Though the drain flow path 7A is provided in the center housing 7 according to the first embodiment, a drain flow path 21A is provided in the driveshaft 21 in place of the drain flow path 7A according to the second embodiment. Specifically, the drain flow path 21A penetrating the arm 27 extends toward an intermediate position in a longitudinal direction within the driveshaft 21. The drain flow path 21A may be provided by a groove provided on a surface of the driveshaft 21, not by a through hole. One end of the drain flow path 21A is opened toward the oil reservoir 33B and the other end is opened toward the oil return chamber 117.

Third Embodiment

Figure 11:
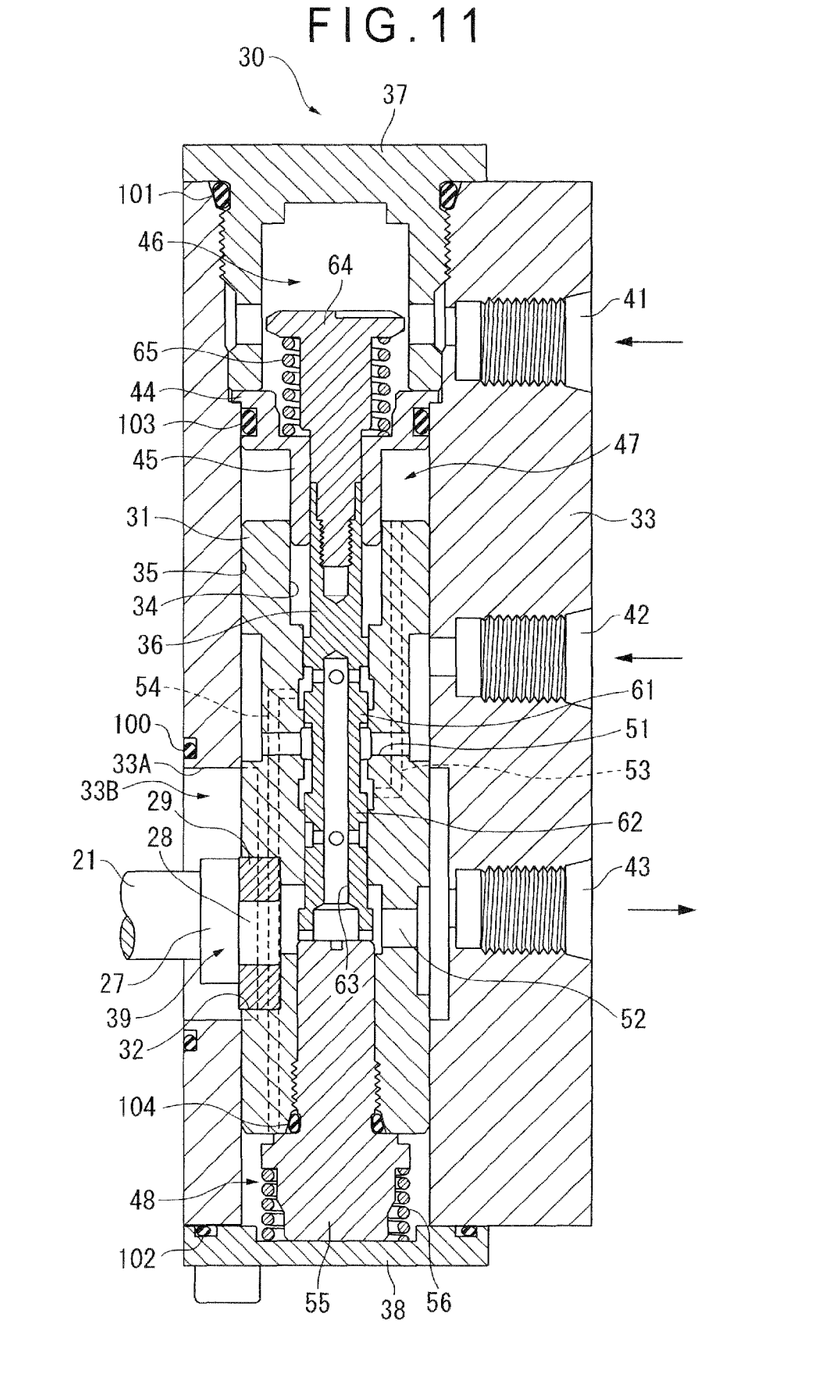
FIG. 11 shows a third embodiment of the invention.
Figure 12:
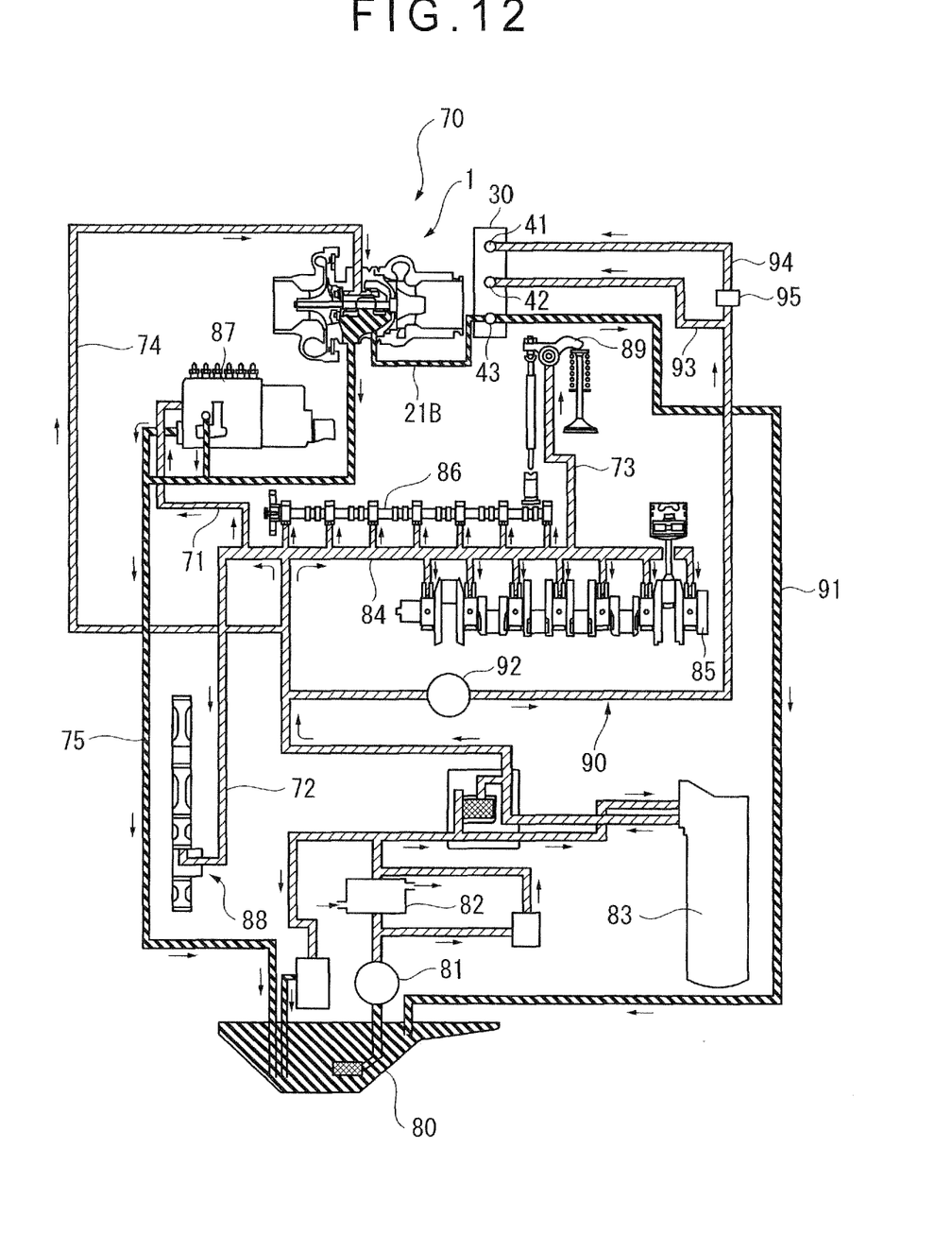
FIG. 12 shows a lubrication circuit according to the third embodiment of the invention.

FIGS. 11 and 12 show a third embodiment of the invention.

The drain flow path 7A or 21A of the first or second embodiment is not provided in the third embodiment. Instead, the oil is delivered into the turbocharger body through the gap surrounding the driveshaft 21, the gap serving as a drain flow path 21B. Also, the housing 33 of the third embodiment is provided with the drain port 43 communicated with the return port 52. A part of the drained oil is returned into the oil pan 80 through a drain path 91 (FIG. 12) from the drain port 43. Other arrangements are the same as those of the first embodiment. With such arrangements, the driveshaft 21 can be favorably lubricated, and therefore a second object of the invention can be achieved.

Although the best arrangement, method, and the like for carrying out the invention have been described above, the scope of the invention is not limited thereto. In other words, although particular embodiments of the invention are mainly illustrated and described, a variety of modifications may be made by those skilled in the art on shapes, amounts, and other detailed arrangements of the embodiments set forth above.

Accordingly, the above description limiting shapes, amounts and the like is exemplary description for facilitating understanding of the invention and does not limit the scope of the invention, so that description with names of members without all of or a portion of the limitations such as limitations on shapes or amounts are included in the scope of the invention.

For example, though the oil return chamber 117 adjacent to the turbocharger body is communicated with the oil reservoir 33B of the hydraulic servo drive device 30 via the drain flow path 7A penetrating the center housing 7 according to the first embodiment, a pipe may be provided to extend from the drain flow path 7A to intercommunicate the oil return chamber 117 and the oil reservoir 33B when the center housing 7 is separated from the housing 33. By employing such a pipe, a degree of layout freedom of the hydraulic servo drive device 30 is increased. Further, as compared with a traditional arrangement in which a pipe for a drain is directly connected to the oil pan 80, the length of the pipe can be considerably reduced, which hardly causes damage to the pipe by vibration.

Furthermore, the drain flow paths 7A, 21A and 21B as described above may be provided in combination. The drain part 43 may be added to the combination. On the other hand, one of the drain flow paths 7A, 21A and 21B may be provided alone. One of the drain flow paths may be selected depending on flow volume of oil and the like. It should be noted that since the drain flow path 7A or 21A is provided, sufficient flow volume of the oil can be returned via the turbocharger body without the drain port 43 and therefore the drain path 91 can be omitted. Thus, the drain flow path 7A or 21A is favorably provided.

The invention is applicable not only to the variable geometry turbocharger in which one exhaust inlet wall is moved toward and away from the other exhaust inlet wall facing to the one exhaust inlet wall in order to change an opening area of a nozzle, but also to a variable geometry turbocharger in which a direction of a nozzle vane is changed to change an opening area of a nozzle.

It is only required that the opening degree changer of the nozzle can be driven by hydraulic pressure in the hydraulic drive device according to the invention. Thus, the automatic control by the servo may not be performed.

The hydraulic drive device of the invention may be attached to the outside of the turbocharger body or may be provided integrally within the center housing as long as the oil exhausted from the hydraulic drive device is returned into the oil return chamber in the center housing.

The invention claimed is:

1. A variable geometry turbocharger, comprising:
   an opening degree changer that changes an opening degree of a nozzle;
   a hydraulic drive device that drives the opening degree changer by hydraulic pressure; and
   a drain flow path that delivers oil exhausted from the hydraulic drive device into a turbocharger body.

2. The variable geometry turbocharger according to claim 1, wherein:
   the opening degree changer includes a driveshaft driven by the hydraulic drive device, and
   the drain flow path is provided in the driveshaft.

3. The variable geometry turbocharger according to claim 1, wherein:
   the opening degree changer includes a driveshaft supported by a bearing and driven by the hydraulic drive device, and
   the drain flow path is provided by a gap between the bearing and the driveshaft.

4. The variable geometry turbocharger according to claim 1, wherein:
   a housing including the opening degree changer therein is provided, and
   the drain flow path is a port that intercommunicates an inside and an outside of the housing.

5. The variable geometry turbocharger according to claim 1, wherein:
   the drain flow path intercommunicates an inside of the turbocharger body and an oil reservoir of the hydraulic drive device.

6. A method of returning oil from a hydraulic drive device, comprising:
   delivering oil supplied to the hydraulic drive device into a turbocharger body; and
   draining the oil from the turbocharger body when an opening degree changer provided in a variable geometry turbocharger for changing an opening degree of a nozzle is driven by the hydraulic drive device.

7. The variable geometry turbocharger according to claim 2, wherein:
   the drain flow path intercommunicates an inside of the turbocharger body and an oil reservoir of the hydraulic drive device.

8. The variable geometry turbocharger according to claim 3, wherein:
   the drain flow path intercommunicates an inside of the turbocharger body and an oil reservoir of the hydraulic drive device.

9. The variable geometry turbocharger according to claim 4, wherein:
   the drain flow path intercommunicates an inside of the turbocharger body and an oil reservoir of the hydraulic drive device.

* * * * *